United States Patent
Orrick

(10) Patent No.: US 8,683,438 B2
(45) Date of Patent: Mar. 25, 2014

(54) SYSTEM, COMPUTER PROGRAM PRODUCT AND METHOD FOR COMPARATIVE DEBUGGING

(75) Inventor: Nicholas W. Orrick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 11/946,257

(22) Filed: Nov. 28, 2007

(65) Prior Publication Data

US 2009/0138853 A1    May 28, 2009

(51) Int. Cl.
*G06F 9/44* (2006.01)
(52) U.S. Cl.
USPC .............................. 717/124; 717/127; 717/128
(58) Field of Classification Search
None
See application file for complete search history.

(56) References Cited

U.S. PATENT DOCUMENTS

| | | | | |
|---|---|---|---|---|
| 4,730,315 A * | 3/1988 | Saito et al. | .................... | 714/38.1 |
| 5,475,843 A * | 12/1995 | Halviatti et al. | ............... | 717/124 |
| 5,862,381 A * | 1/1999 | Advani et al. | .................. | 717/128 |
| RE36,422 E * | 11/1999 | Pazel | ............................ | 717/125 |
| 6,125,375 A | 9/2000 | Atkins et al. | | |
| 6,247,020 B1 | 6/2001 | Minard | | |
| 6,295,613 B1 * | 9/2001 | Bates et al. | ...................... | 714/43 |
| 6,467,082 B1 * | 10/2002 | D'Arcy et al. | ................. | 717/127 |
| 6,516,460 B1 * | 2/2003 | Merks et al. | .................... | 717/124 |
| 6,593,940 B1 | 7/2003 | Petersen et al. | | |
| 6,611,276 B1 * | 8/2003 | Muratori et al. | ............... | 715/772 |
| 6,654,911 B1 * | 11/2003 | Miles | .......................... | 714/38.13 |
| 6,654,950 B1 | 11/2003 | Barnishan | | |
| 6,671,825 B1 * | 12/2003 | Joshi et al. | ..................... | 717/124 |
| 6,721,941 B1 * | 4/2004 | Morshed et al. | ............... | 717/127 |
| 6,829,733 B2 | 12/2004 | Richardson et al. | | |
| 6,961,924 B2 * | 11/2005 | Bates et al. | .................... | 717/125 |
| 6,964,036 B2 * | 11/2005 | Bates et al. | .................... | 717/125 |
| 7,028,223 B1 | 4/2006 | Kolawa et al. | | |
| 7,149,900 B2 * | 12/2006 | Rothrock | ....................... | 717/124 |
| 7,150,002 B1 * | 12/2006 | Anderson et al. | ............. | 717/107 |
| 7,174,536 B1 * | 2/2007 | Kothari et al. | ................. | 717/109 |
| 7,203,926 B2 * | 4/2007 | Bogle et al. | .................... | 717/124 |
| 7,210,127 B1 * | 4/2007 | Rangachari | .................... | 717/128 |
| 7,310,777 B2 * | 12/2007 | Cirne | ............................. | 715/763 |
| 7,464,297 B2 * | 12/2008 | Potter et al. | ................. | 714/38.14 |
| 7,512,934 B2 * | 3/2009 | Gatlin et al. | ................... | 717/124 |
| 7,530,056 B1 * | 5/2009 | Yaari et al. | ..................... | 717/128 |
| 7,757,126 B2 * | 7/2010 | Vidiyala | .................... | 714/38.14 |

(Continued)

OTHER PUBLICATIONS

Fredrik Manne, et al., "Automating the Debuggin of Large Numerical Codes", Published in the book "Modern software tools for scientific computing", Binkhauser Boston Inc. Combridge, MA, USA 1997 [retrieved on Mar. 6, 2011]. Retrieved from the internet: <URL:http://citeseerx.ist.psu.edu/viewdoc/download?doi=10.1.1.42.5307&rep=rep1&type=pdf>; pp. 1-14.*

(Continued)

*Primary Examiner* — Thuy Dao
*Assistant Examiner* — Xi D Chen
(74) *Attorney, Agent, or Firm* — Holland & Knight, LLP; Brian J. Colandreo, Esq.; Jeffrey T. Placker, Esq.

(57) ABSTRACT

A method, computer program product, and computing device for initiating a first instance of an application to be debugged. A second instance of the application to be debugged is initiated. A common command is simultaneously executed on the first and second instances of the application to be debugged.

20 Claims, 3 Drawing Sheets

(56) References Cited

U.S. PATENT DOCUMENTS

| | | | |
|---|---|---|---|
| 7,827,438 B2 * | 11/2010 | Tarta | 714/4.1 |
| 7,844,952 B2 * | 11/2010 | Barsness et al. | 717/125 |
| 7,844,955 B2 * | 11/2010 | Tateishi et al. | 717/131 |
| 7,958,486 B2 * | 6/2011 | Tsyganskiy et al. | 717/127 |
| 8,095,914 B1 * | 1/2012 | Singh et al. | 717/128 |
| 8,365,149 B2 * | 1/2013 | Frank et al. | 717/128 |
| 8,468,502 B2 * | 6/2013 | Lui et al. | 717/127 |
| 2005/0223359 A1 * | 10/2005 | Rao Nagaraju et al. | 717/124 |
| 2006/0101405 A1 * | 5/2006 | Buschardt et al. | 717/124 |
| 2006/0123395 A1 * | 6/2006 | Andrews et al. | 717/127 |
| 2009/0222795 A1 * | 9/2009 | Frank et al. | 717/127 |
| 2010/0318972 A1 * | 12/2010 | Xu et al. | 717/128 |
| 2012/0151445 A1 * | 6/2012 | Maybee | 717/124 |

OTHER PUBLICATIONS

Abramson, "A Debugging Tool for Software Evolution", 1995, IEEE; <retrieved on Jun. 26, 2012>; Retrieved from Internet <URL:http://ieeexplore.ieee.org/stamp/stamp.jsp?tp=&arnumber=514716>;pp. 282-290.*

Watson, Abramson, "The Architecture of a Parallel Relative Debugger", Proceedings fo the 13$^{th}$ International Conference on Parallel and Distributed Computer Systems, 2000; <retrieved on Jun. 26, 2012>; Retrieved from Internet <URL:http://citeseerx.ist.psu.edu/viewdoc/download?doi=10.1.1.121.8728&rep=rep1&type=pdf>;pp. 1-8.*

Searle, "Automatic Relative Debugging", 2006, Queensland University of Technology; [retrieved on Jun. 11, 2013]; Retrieved from Internet <URL:http://eprints.qut.edu.au/16445/1/Aaron_Searle_Thesis.pdf>;pp. 1-10; pp. 140-150.*

Marlow, et al., "A Lightweight Interactive Debugger for Haskell"; 2007 ACM; [retrieved on Oct. 19, 2013]; Retreived from Internet <URL:http://dl.acm.org/citation.cfm?id=1291201>;pp. 13-24.*

Linderman, et al., "Declaratively Defining Domain-Specific Language Debuugers"; 2011 ACM; [retrieved on Oct. 19, 2013]; Retreived from Internet <URL:http://dl.acm.org/citation.cfm?id=2047862>;pp. 127-136.*

Anderson, et al., Efficient tracing and performance analysis for large distributed systems; 2009 IEEE; [retrieved on Oct. 19, 2013]; Retreived from Internet <URL:http://ieeexplore.ieee.org/stamp/samp.jsp?tp=&arnumber=5366158>;pp. 1-10.*

Tanter, et al., "Back to the Future: Omniscient Debugging", 2009, IEEE; [retrieved on Oct. 19, 2013]; Retreived from Internet <URL:http://ieeexplore.ieee.org/stamp/samp.jsp?tp=&arnumber=5287015>;pp. 78-85.*

Cleve, et al., "Locating Causes of Program Failures", ICSE (2005), pp. 1-10.

Lee, et al., "A Development of Remote Tracepoint Debugger for Run-time Monitoring and Debugging of Timing Constraints on Qplus-P RTOS", IEEE Workshop on Software Technologies for Future Embedded Systems (WSTFES '03), pp. 1-4.

* cited by examiner

SYSTEM, COMPUTER PROGRAM PRODUCT AND METHOD FOR COMPARATIVE DEBUGGING

TECHNICAL FIELD

This disclosure relates to debugging and, more particularly, simultaneous debugging of multiple instances of an application.

BACKGROUND

Software applications are typically updated during the course of their useful life. For example, Version 1.0 of an application maybe upgraded to Version 1.1 via e.g., a patch, a service pack, or a replacement application. Unfortunately, whenever a portion of an application is changed, the stability of the application may be compromised. For example, an application that is inherently stable may be upgraded and become unstable due to various software bugs.

Accordingly, software developers often use debugging programs to sequentially execute the code of an unstable application to determine the reason for the instability. Being that it is often desirable to simultaneously analyze the stable (e.g., earlier version) application so that comparisons may be made with the unstable application, the software developer may be required to utilize two computer systems to execute two debugging applications so that the two versions of the application may be compared.

SUMMARY OF DISCLOSURE

In an implementation, a debugging method includes initiating a first instance of an application to be debugged. A second instance of the application to be debugged is initiated. A common command is simultaneously executed on the first and second instances of the application to be debugged.

One or more of the following features may be included. At least one data component associated with the first and second instances of the application may be monitored. The at least one data component associated with the first instance of the application and the at least one data component associated with the second instance of the application may be compared.

Comparing the at least one data component may include determining a differential between the at least one data component associated with the first instance of the application and the at least one data component associated with the second instance of the application. The differential may be rendered within a visual user interface.

The at least one data component associated with the first instance of the application and the at least one data component associated with the second instance of the application may be simultaneously displayed. The at least one data component may be chosen from the group consisting of: a variable, an object, a call stack, and a portion of source code.

In another implementation, a computer program product resides on a computer readable medium that has a plurality of instructions stored on it. When executed by a processor, the instructions cause the processor to perform operations including initiating a first instance of an application to be debugged. A second instance of the application to be debugged is initiated. A common command is simultaneously executed on the first and second instances of the application to be debugged.

One or more of the following features may be included. At least one data component associated with the first and second instances of the application may be monitored. The at least one data component associated with the first instance of the application and the at least one data component associated with the second instance of the application may be compared.

Comparing the at least one data component may include determining a differential between the at least one data component associated with the first instance of the application and the at least one data component associated with the second instance of the application. The differential may be rendered within a visual user interface.

The at least one data component associated with the first instance of the application and the at least one data component associated with the second instance of the application may be simultaneously displayed. The at least one data component may be chosen from the group consisting of: a variable, an object, a call stack, and a portion of source code.

In another implementation, a computing device is configured for performing operations including initiating a first instance of an application to be debugged. A second instance of the application to be debugged is initiated. A common command is simultaneously executed on the first and second instances of the application to be debugged.

One or more of the following features may be included. At least one data component associated with the first and second instances of the application may be monitored. The at least one data component associated with the first instance of the application and the at least one data component associated with the second instance of the application may be compared.

Comparing the at least one data component may include determining a differential between the at least one data component associated with the first instance of the application and the at least one data component associated with the second instance of the application. The differential may be rendered within a visual user interface.

The at least one data component associated with the first instance of the application and the at least one data component associated with the second instance of the application may be simultaneously displayed. The at least one data component may be chosen from the group consisting of: a variable, an object, a call stack, and a portion of source code.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a visual user interface rendered by the debugging process of FIG. 1.

Like reference symbols in the various drawings indicate like elements.

DETAILED DESCRIPTION OF THE PREFERRED EMBODIMENTS

Figure 1:
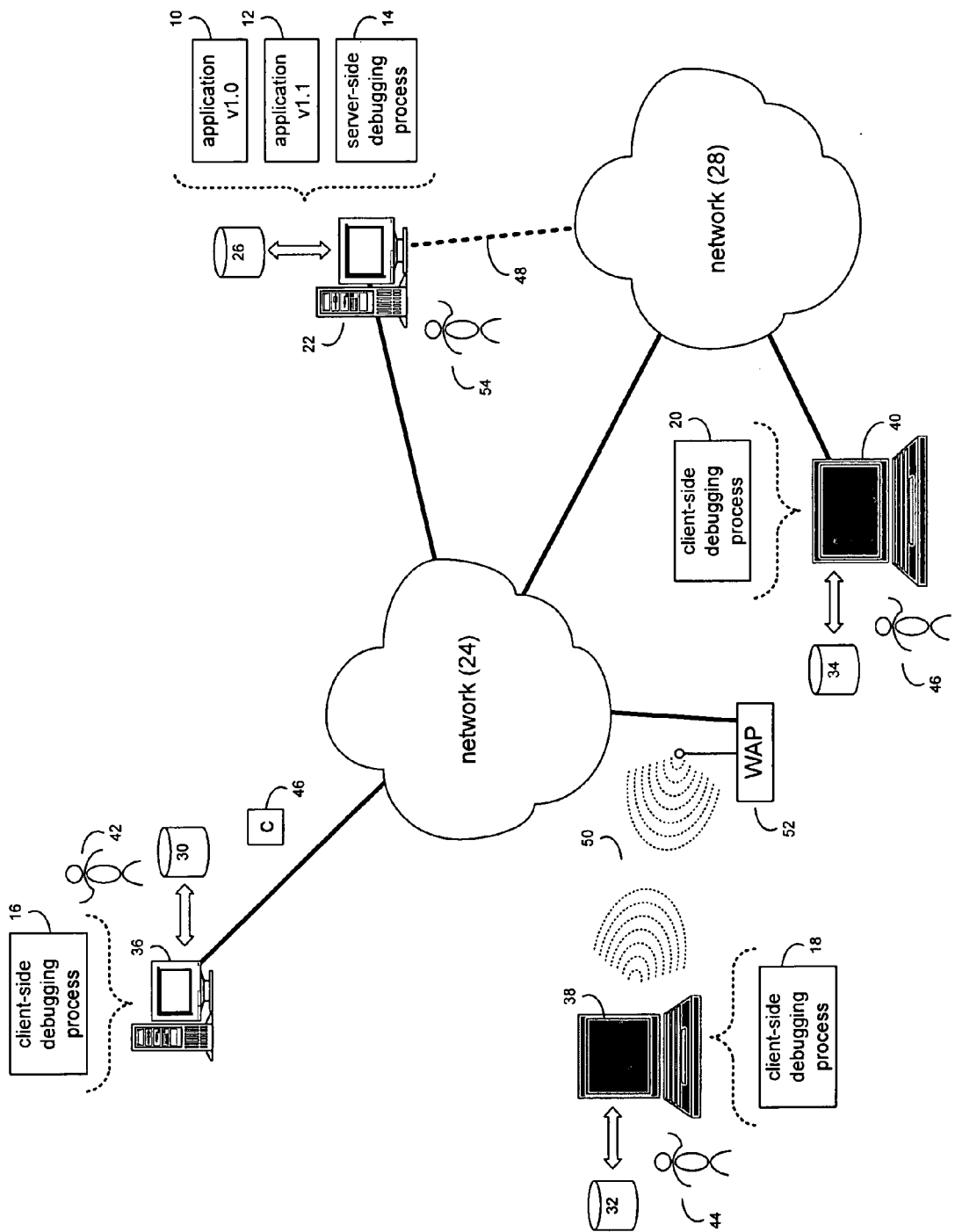
FIG. 1 is a diagrammatic view of a debugging process coupled to a distributed computing network.

System Overview:

Referring to FIG. 1, there is shown a debugging process. As will be discussed below in greater detail, the debugging process may initiate a first instance of an application to be debugged (e.g., application v1.0 10) and may initiate a second instance of the application (e.g., application v1.1 12) to be debugged. A common command may be simultaneously executed on the first and second instances of the application to be debugged.

The above-described debugging process may be a server-side debugging process (e.g., server-side debugging process 14), a client-side debugging process (e.g., client-side debugging process 16, 18, 20), or a hybrid server-side/client-side debugging process (e.g., the combination of server-side debugging process 14 and one or more of client-side debugging processes 16, 18, 20).

Server-side debugging process 14 may reside on and may be executed by server computer 22, which may be connected to network 24 (e.g., the Internet or a local area network). Examples of server computer 22 may include, but are not limited to: a personal computer, a server computer, a series of server computers, a mini computer, and a mainframe computer. Server computer 22 may be a web server (or a series of servers) running a network operating system, examples of which may include but are not limited to: Microsoft Windows 2003 Server™; Novell Netware™; or Redhat Linux™, for example.

Server-side debugging process 14 may be a stand alone debugging application or an applet/application that is executed within a third-party debugging application (not shown).

The instruction sets and subroutines of server-side debugging process 14, which may be stored on storage device 26 coupled to server computer 22, may be executed by one or more processors (not shown) and one or more memory architectures (not shown) incorporated into server computer 22. Storage device 26 may include but is not limited to: a hard disk drive; a tape drive; an optical drive; a RAID array; a random access memory (RAM); and a read-only memory (ROM).

Server computer 22 may execute a web server application, examples of which may include but are not limited to: Microsoft IIS™, Novell Webserver™, or Apache Webserver™, that allows for HTTP (i.e., HyperText Transfer Protocol) access to server computer 22 via network 24. Network 24 may be connected to one or more secondary networks (e.g., network 28), examples of which may include but are not limited to: a local area network; a wide area network; or an intranet, for example.

The instruction sets and subroutines of client-side debugging processes 16, 18, 20, which may be stored on storage devices 30, 32, 34 (respectively) coupled to client electronic devices 36, 38, 40 (respectively), may be executed by one or more processors (not shown) and one or more memory architectures (not shown) incorporated into client electronic devices 36, 38, 40 (respectively). Storage devices 30, 32, 34 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 36, 38, 40 may include, but are not limited to, personal computer 36, laptop computer 38, and notebook computer 40, for example.

Users 42, 44, 46 may access server computer 22 directly through the device on which the client-side debugging process (e.g., client-side debugging processes 16, 18, 20) is executed, namely client electronic devices 36, 38, 40, for example. Users 42, 44, 46 may access server computer 22 directly through network 24 or through secondary network 28. Further, server computer 22 may be coupled to network 24 through secondary network 28, as illustrated with phantom link line 48.

The various client electronic devices may be directly or indirectly coupled to network 24 (or network 28). For example, personal computer 36 is shown directly coupled to network 24 via a hardwired network connection. Further, notebook computer 40 is shown directly coupled to network 28 via a hardwired network connection. Laptop computer 38 is shown wirelessly coupled to network 24 via wireless communication channel 50 established between laptop computer 38 and wireless access point (i.e., WAP) 52, which is shown directly coupled to network 24. WAP 52 may be, for example, an IEEE 802.11a, 802.11b, 802.11g, Wi-Fi, and/or Bluetooth device that is capable of establishing wireless communication channel 50 between laptop computer 38 and WAP 52.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 36, 38, 40 may each execute an operating system, examples of which may include but are not limited to Microsoft Windows™, Microsoft Windows CE™, Redhat Linux™, or a custom operating system.

The Debugging Process:

While the above-described debugging process may be implemented as a server-side debugging process, a client-side debugging process, or a hybrid server-side/client-side debugging process, for illustrative purposes, the following discussion will be limited to the server-side debugging process (e.g., server-side debugging process 14). However, it is understood that other configurations (e.g., the client-side debugging process, or the hybrid server-side/client-side debugging process) are possible and are considered to be within the scope of this disclosure.

As discussed above and as will be discussed below in greater detail, server-side debugging process 14 may initiate a first instance of an application to be debugged (e.g., application v1 10) and may initiate a second instance of the application (e.g., application v2 12) to be debugged. A common command may be simultaneously executed on the first and second instances of the application to be debugged.

Figure 2:
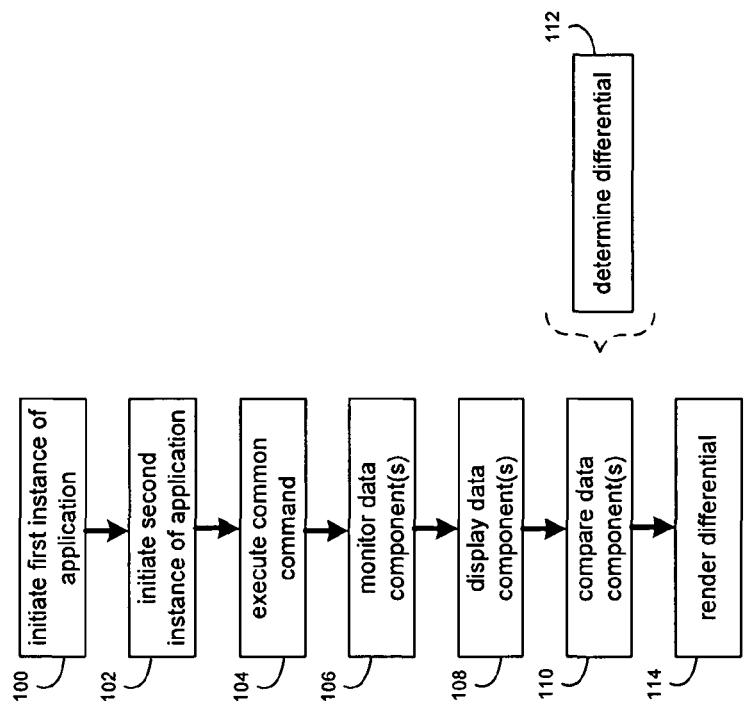
FIG. 2 is a flowchart of the debugging process of FIG. 1.

Referring also to FIG. 2, server-side debugging process 14 may initiate 100 a first instance (e.g., a first version) of an application to be debugged and may initiate 102 a second instance (e.g., a second version) of the application to be debugged. Specifically, during the development process, one or more features within an application may be changed in order to e.g., enhance the product and/or include new functionality. Unfortunately, the implementation of such changes may result in flawed execution of the application under development.

For example, assume that application v1.0 10 is Version 1.0 of a web-based mapping application and that application v1.1 12 is Version 1.1 of the same web-based mapping application. Further, assume that application v1.0 10 is a well tested application that works essentially flawlessly, while application v1.1 12 tends to be error prone and often results in one or more execution errors when executing e.g., a search for towns within South Carolina (i.e., searches that did not result in execution errors in application v1.0 10). Assume for illustrative purposes that user 54 is a program tester that was tasked with resolving execution errors (e.g., such as the above-described error) within application v1.1 12.

As discussed above, server-side debugging process 14 may initiate 100 a first instance of an application to be debugged and may initiate 102 a second instance of the application to be debugged. Further, server-side debugging process 14 may simultaneously execute 104 a common command on the first and second instances of the application to be debugged. Server-side debugging process 14 may allow user 44 to define the particular common command to be executed on application v1.0 10 and application v1.1 12. Since application v1.1 12 is known to generate one or more execution errors when executing e.g., a search for towns within South Carolina, user 44 may define the common command to generate and map the town of Spartanburg, S.C.

Once this common command (e.g., generate and map the town of Spartanburg, S.C.) is received by both application v1.0 10 and application v1.1 12, applications 10, 12 may each process the received command to determine e.g., which functions need to be called and which code needs to be executed. Server-side debugging process 10 may set breakpoints within the code of application v1.0 10 and application v1.1 12. As is known in the art, a breakpoint is an intentional stopping or pausing point within a program that is utilized for debugging purposes. More generally, a breakpoint is a means of acquiring knowledge about a program during its execution. For example, during the interruption, the programmer (e.g., user 54) may inspect various data components associated with e.g., application v1.0 10 and application v1.1 12 to determine whether the program is functioning as expected.

Figure 3:
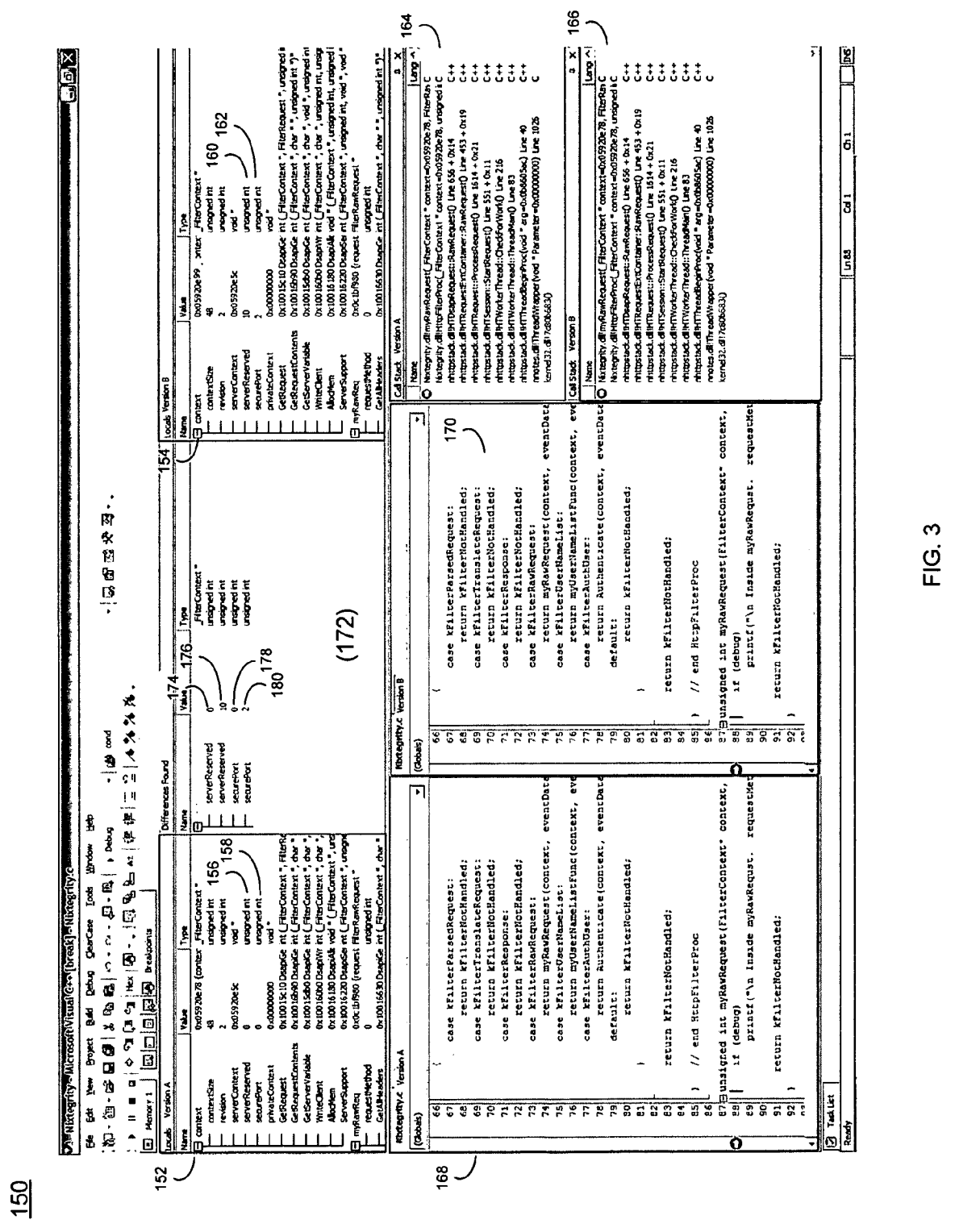

During execution of the above-described common command, server-side debugging process 14 may monitor 106 at least one of the above-referenced data components associated with the first and second instances of the application. Referring also to FIG. 3, examples of such data components (as illustrated within visual user interface 150 of server-side debugging process 14) may include but are not limited to objects (e.g., objects 152, 154), variables associated with an object (e.g., variables 156, 158, 160, 162), call stacks (e.g., call stacks 164, 166), and portions of source code (e.g., source code 168, 170).

As is known in the art, an object may be an individual run-time unit that may be used as the basic building block of programs, wherein the objects may act upon each other. A variable may be a symbolic representation of a quantity/ expression and/or a place wherein a quantity may be stored. Further, a call stack may be a stack that stores information concerning the active subroutines of a computer program. Additionally, source code may be any sequence of statements and/or declarations written in some human-readable computer programming language.

Server-side debugging process 14 may simultaneously display 108 at least one data component associated with the first instance of the application and the at least one data component associated with the second instance of the application. Continuing with the above-stated example, assume that user 54, via server-side debugging process 14, initiates 100 application v1.0 10 and initiates 102 application v1.1 12. Further assume that server-side debugging process 14 may simultaneously execute 104 a common command (e.g., generate and map the town of Spartanburg, S.C.) on the first and second instances (e.g., application v1.0 10 and application v1.1 12) of the application to be debugged.

Once this common command is received by both application v1.0 10 and application v1.1 12, applications 10, 12 may each process the received common command to determine e.g., which functions need to be called and which code needs to be executed. Application v1.0 10 and application v1.1 12 may be executed until the above-described breakpoint is reached, at which point server-side debugging process 14 may pause application v1.0 10 and application v1.1 12 so that user 54 may determine the status of one or more of the above-described data components (e.g., objects 152, 154, variables 156, 158, 160, 162, call stacks 164, 166, and source code portions 168, 170).

The above-described break point may be positioned e.g., prior to the area suspected of being problematic so that user 54 may manually cycle through the various code-portions of the applications (e.g., application v1.0 10 and application v1.1 12) and monitor the status of the above-described data components.

Server-side debugging process 14 may compare 110 at least one data component associated with the first instance of the application (e.g., application v1.0 10) and at least one data component associated with the second instance of the application (e.g., application v1.1 12) to determine 112 a differential between the compared 110 data components. Server-side debugging process 14 may render 114 this differential within visual user interface 150.

Continuing with the above-described example, server-side debugging process 14 may e.g., compare 110 a variable value of application v1.0 10 to the same variable value of e.g., application v1.1 12 to determine 112 a differential between the compared variables. Specifically, variable "serverReserved" 156 of object 152 for application v1.0 10 is shown within visual user interface 150 to have a value of "0". Further, variable "serverReserved" 160 of object 154 for application v1.1 12 is shown within visual user interface 150 to have a value of "10". Additionally, variable "securePort" 158 of object 152 for application v1.0 10 is shown within visual user interface 150 to have a value of "0", while variable "securePort" 162 of object 154 for application v1.1 12 is shown within visual user interface 150 to have a value of "2".

Server-side debugging process 14 may compare 110 variable "serverReserved" 156 with "serverReserved" 160 to determine 112 the difference between these variables. Further, server-side debugging process 14 may compare 110 variable "securePort" 158 with "securePort" 162 to determine 112 the difference between these variables. Additionally, server-side debugging process 14 may compare 110 other data components (e.g., objects 152, 154, call stacks 164, 166, and source code portions 168, 170) to determine 112 additional differentials.

When server-side debugging process 14 renders 114 the differentials of the above-described data-components, server-side debugging process 14 may e.g., display the value of the individual data components or may display the difference of the values of the individual data components. For example, visual user interface 150 (which may be rendered by server-side debugging process 14) is shown to include differential window 172 that: defines the value 174 of variable "serverReserved" 156 as "0"; defines the value 176 of variable "serverReserved" 160 as "10"; defines the value 178 of variable "securePort" 158 as "0"; and defines the value 180 of variable "securePort" 162 as "2". Additionally, server-side debugging process 14 may be configured so that when the differentials of the above-described data-components are rendered 114, color may be used to differentiate the various groups of differentials. For example, visual user interface 150 (which may be rendered by server-side debugging process 14) may display variable "serverReserved" 156 in the color red; may display variable "securePort" 158 in the color red; may display variable "serverReserved" 160 in the color blue; and may display variable "securePort" 162 in the color blue.

Alternatively and as discussed above, when server-side debugging process 14 renders 114 the differentials of the above-described data-components, server-side debugging process 14 may e.g., display the difference of the values of the individual data components. For example, differential window 172 within visual user interface 150 (which may be rendered by server-side debugging process 14) may define the differential of "serverReserved" (i.e., "ΔserverReserved") as "−10" (i.e., "0"-"10") and may define the differential of "securePort" (i.e., "ΔsecurePort") as "−2" (i.e., "0"-"2").

A number of implementations have been described. Nevertheless, it will be understood that various modifications may be made. Accordingly, other implementations are within the scope of the following claims.

What is claimed is:

1. A debugging method comprising:
   initiating, via one or more computing devices, a first instance of an application to be debugged;
   initiating a second instance of the application to be debugged, wherein the first instance and the second instance are distinct;
   defining a common command to be executed by the first instance of the application to be debugged and the second instance of the application to be debugged;
   processing the common command to determine which functions to call and which code to execute on the first instance and the second instance of the application based upon, at least in part, the common command;
   automatically setting breakpoints within the code of the first instance and the second instance of the application;
   simultaneously executing the common command by the first and second instances of the application to be debugged;
   monitoring, based upon the automatically set breakpoints, at least one data component associated with the first and second instances of the application; and
   displaying a value of the at least one data component associated with the first instance of the application and a value of the at least one data component associated with the second instance of the application, wherein the value of the at least one data component associated with the first instance of the application and the value of the at least one data component associated with the second instance of the application are simultaneously displayed within a single user interface.

2. The method of claim 1 further comprising:
   comparing the value of the at least one data component associated with the first instance of the application and the value of the at least one data component associated with the second instance of the application.

3. The method of claim 2 wherein comparing the value of the at least one data component includes:
   determining a differential between the value of the at least one data component associated with the first instance of the application and the value of the at least one data component associated with the second instance of the application.

4. The method of claim 3 further comprising:
   rendering the differential within a visual user interface.

5. The method of claim 1 wherein the at least one data component is chosen from the group consisting of: a variable, an object, a call stack, and a portion of source code.

6. The method of claim 1, wherein the at least one data component associated with the first and second instances of the application is a variable.

7. The method of claim 1, wherein the at least one data component associated with the first and second instances of the application is an object.

8. The method of claim 1, wherein the at least one data component associated with the first and second instances of the application is a call stack.

9. A computer program product residing on a non-transitory computer readable medium having a plurality of instructions stored thereon which, when executed by a processor, cause the processor to perform operations comprising:
   initiating a first instance of an application to be debugged;
   initiating a second instance of the application to be debugged, wherein the first instance and the second instance are distinct;
   defining a common command to be executed by the first instance of the application to be debugged and the second instance of the application to be debugged;
   processing the common command to determine which functions to call and which code to execute on the first instance and the second instance of the application based upon, at least in part, the common command;
   automatically setting breakpoints within the code of the first instance and the second instance of the application;
   simultaneously executing the common command by the first and second instances of the application to be debugged;
   monitoring, based upon the automatically set breakpoints, at least one data component associated with the first and second instances of the application; and
   displaying a value of the at least one data component associated with the first instance of the application and a value of the at least one data component associated with the second instance of the application, wherein the value of the at least one data component associated with the first instance of the application and the value of the at least one data component associated with the second instance of the application are simultaneously displayed within a single user interface.

10. The computer program product of claim 9 further comprising instructions for:
    comparing the value of the at least one data component associated with the first instance of the application and the value of the at least one data component associated with the second instance of the application.

11. The computer program product of claim 10 wherein the instructions for comparing the value of the at least one data component include instructions for:
    determining a differential between the value of the at least one data component associated with the first instance of the application and the value of the at least one data component associated with the second instance of the application.

12. The computer program product of claim 11 further comprising instructions for:
    rendering the differential within a visual user interface.

13. The computer program product of claim 9 wherein the at least one data component is chosen from the group consisting of: a variable, an object, a call stack, and a portion of source code.

14. The computer program product of claim 9, wherein the at least one data component associated with the first and second instances of the application is a variable.

15. The computer program product of claim 9, wherein the at least one data component associated with the first and second instances of the application is an object.

16. The computer program product of claim 9, wherein the at least one data component associated with the first and second instances of the application is a call stack.

17. A computing system comprising:
    at least one processor and at least one memory architecture coupled with the at least one processor, the computing system configured for performing operations comprising:

initiating a first instance of an application to be debugged;

initiating a second instance of the application to be debugged, wherein the first instance and the second instance are distinct;

defining a common command to be executed by the first instance of the application to be debugged and the second instance of the application to be debugged;

processing the common command to determine which functions to call and which code to execute on the first instance and the second instance of the application based upon, at least in part, the common command;

automatically setting breakpoints within the code of the first instance and the second instance of the application;

simultaneously executing the common command by the first and second instances of the application to be debugged;

monitoring, based upon the automatically set breakpoints, at least one data component associated with the first and second instances of the application; and displaying a value of the at least one data component associated with the first instance of the application and a value of the at least one data component associated with the second instance of the application, wherein the value of the at least one data component associated with the first instance of the application and the value of the at least one data component associated with the second instance of the application are simultaneously displayed within a single user interface.

18. The computing system of claim 17, wherein the computing system is further configured to perform operations comprising:

comparing the value of the at least one data component associated with the first instance of the application and the value of the at least one data component associated with the second instance of the application.

19. The computing system of claim 18 wherein comparing the value of the at least one data component includes:

determining a differential between the value of the at least one data component associated with the first instance of the application and the value of the at least one data component associated with the second instance of the application.

20. The computing system of claim 19, wherein the computing system is further configured to perform operations comprising:

rendering the differential within a visual user interface.

\* \* \* \* \*